United States Patent
Chen

(10) Patent No.: US 7,743,106 B2
(45) Date of Patent: Jun. 22, 2010

(54) MESSAGE DISSEMINATION SYSTEM FOR NOMINATING A TRIGGER EVENT TO A SPECIFIC DESTINATION BASED ON COMMUNICATION CHANNEL AND MESSAGE IDENTIFIERS

(76) Inventor: Chuan Pei Chen, 18B Massey Avenue, Greenlane, Auckland (NZ) 1005

( * ) Notice: Subject to any disclaimer, the term of this patent is extended or adjusted under 35 U.S.C. 154(b) by 179 days.

(21) Appl. No.: 11/575,537

(22) PCT Filed: Nov. 9, 2005

(86) PCT No.: PCT/NZ2005/000299

§ 371 (c)(1),
(2), (4) Date: Mar. 19, 2007

(87) PCT Pub. No.: WO2007/011240

PCT Pub. Date: Jan. 25, 2007

(65) Prior Publication Data

US 2008/0104214 A1    May 1, 2008

(30) Foreign Application Priority Data

Jul. 20, 2005    (NZ) .................................... 541356

(51) Int. Cl.
   *G06F 15/16*    (2006.01)
(52) U.S. Cl. ...................................... 709/207; 709/206
(58) Field of Classification Search ............ 379/201.03, 379/88.22, 211.02; 370/352; 709/203, 207, 709/206; 455/407, 415, 445
See application file for complete search history.

(56) References Cited

U.S. PATENT DOCUMENTS

| 5,745,850 | A  |   | 4/1998  | Aldermeshian et al. |
| 6,167,255 | A  |   | 12/2000 | Kennedy, III et al. |
| 6,535,743 | B1 |   | 3/2003  | Kennedy, III et al. |
| 6,647,272 | B1 |   | 11/2003 | Asikainen |
| 2003/0162539 | A1 |   | 8/2003 | Fiut et al. |
| 2005/0277408 | A1 | * | 12/2005 | Stuckman et al. ........... 455/415 |
| 2006/0025141 | A1 | * | 2/2006 | Marsh et al. ............... 455/445 |
| 2006/0040642 | A1 | * | 2/2006 | Boris et al. ................ 455/407 |
| 2006/0136546 | A1 | * | 6/2006 | Trioano et al. ............. 709/203 |
| 2006/0177034 | A1 | * | 8/2006 | Reding et al. ........... 379/211.02 |
| 2006/0210034 | A1 | * | 9/2006 | Beadle et al. ............ 379/88.22 |
| 2007/0274291 | A1 | * | 11/2007 | Diomelli .................... 370/352 |
| 2009/0097627 | A9 | * | 4/2009 | Liljestrand et al. ..... 379/201.03 |

FOREIGN PATENT DOCUMENTS

KR        20010057674        7/2001

\* cited by examiner

*Primary Examiner*—Le Luu
(74) *Attorney, Agent, or Firm*—Brooks Kushman P.C.

(57) ABSTRACT

A method of generating a message by providing on a communication channel an indication of a message identifier, the combination of communication channel and identifier uniquely indicating a message for any specific destination.

19 Claims, 3 Drawing Sheets

MESSAGE DISSEMINATION SYSTEM FOR NOMINATING A TRIGGER EVENT TO A SPECIFIC DESTINATION BASED ON COMMUNICATION CHANNEL AND MESSAGE IDENTIFIERS

TECHNICAL FIELD

The invention generally relates to the dissemination of a message to a user of a communication channel.

More particularly the invention relates to the dissemination of a message on a type of communication medium and with a content which carries a special meaning to the receiver.

BACKGROUND ART

Telecommunication services are widely available around the world. A person can simply pick up a phone and dial a destination number at any location through the public switching telephone network (PSTN), wireless networks (Cell Phone) and the Internet.

Similarly messaging via networks of various other protocols is well known and these protocols act to transfer messages from place to place.

The telecommunication networks process calls to and from different subscriber telephones based on a unique telephone number or other ID, and the Internet routes calls based on the source and destination network identifier or IP address.

Another popular communication method is short message service. A person can use an SMS capable terminal or service to send an SMS/MMS to another persons' SMS/MMS capable terminal.

One of the services provided by many telecommunication networks is caller identification. It is designed to allow the caller to be identified prior to the call being answered. However, caller identification is currently limited to identification the landline or wireless telephone number and the name of the subscriber of a service.

The present invention relates to a method for disseminating of signals and delivering a message or response to a destination in an interactive environment. It may utilise standard telecommunication and network communication media with suitable standard telecommunication or network communication equipment. More particularly, it relates to methods for transmitting a message through the use of the communication facilities of a process, instead of the traditional approach of using the message facilities of a connection for the purpose of transmitting a message.

Therefore, in view of the foregoing, it would be advantageous to provide a method, system, and program for providing a fast, reliable method of communication that ensures a message reaches the destination as requested, automatically.

The present invention provides a solution to this and other problems which offers advantages over the prior art or which will at least provide the public with a useful choice.

SUMMARY OF THE INVENTION

In one exemplification the invention lies in a method of sending a message on a communication channel having an originating end and a receiving end comprising:

disseminating to originator and receiver a concordance of combinations of specified communication channel and specified message identifiers as providing specified messages, specifying a communication channel capable of carrying data identifying the required message, nominating a trigger event to cause the specified identifying data to be sent on the specified communication channel, issuing the specified message at the originating end of the communication channel on occurrence of the trigger event, detecting the specified data at the receiving end of the communication channel, confirming receipt of the specified data at the communication channel receiving end, terminating the communication on confirmation of receipt.

Preferably the trigger event results in the issuing of multiple different message identifiers on multiple different communication channels.

Preferably one communication channel is a telephone line.

Preferably a message identifier is the telephone caller ID data.

Preferably the trigger event is generated at the lapse of a specified time.

Preferably the trigger event is generated on receipt of a specified message at the message issuer.

Preferably one communication channel is one port of a TCP/IP address.

Preferably a message identifier is the IP source address.

Preferably a list of available trigger events is held in a database at the message disseminator Preferably each trigger event record has associated with it the information required to actuate that trigger event.

Preferably the actuating information is an incoming communication to the message disseminator.

Preferably the incoming communication required to trigger a specific trigger event is on a specified communication channel and contains a specified message identifier.

Preferably if the receipt of a message originating from a trigger event is not confirmed, a further trigger event is forced.

In a further exemplification the invention lies in a message disseminator comprising:

an interface to multiple communication channels,
a database maintaining a list of trigger events, communication channels, message identifiers and message texts,
a trigger event actuator acting to cause the retrieval of a listed trigger event record and the subsequent issuing of a listed message identifier on a listed communication channel,
a receipt identifier identifying when the message identifier has been received on the communication channel.

Preferably the trigger event actuator is actuable by an incoming communication.

Preferably the actuator is actuable by an internal event.

Preferably the internal event is the expiration of a timing period.

Preferably the communication channel is a telephone line, and the message receipt identifier is the off hook signal.

Preferably the communication channel is an IP packet and the message receipt identifier is the confirmation of packet receipt.

These and other features of as well as advantages which characterise the present invention will be apparent upon reading of the following detailed description and review of the associated drawings.

BRIEF DESCRIPTION OF THE DRAWINGS

The accompanying drawings, which are incorporated in and form a part of the specification, illustrate preferred embodiments of the present invention and, together with the description, serve to explain the principles of the invention. In the drawings:

FIG. 3 is a layout of a typical user display, capable of being printed to show a user the message corresponding to a calling identifier.

FIG. 5 is a layout of the method of choosing an alternative communication method.

DESCRIPTION OF THE INVENTION

Reference will now be made in detail to preferred embodiments of the invention, non-limiting examples of which are illustrated in the accompanying drawings.

Figures 1, 2:
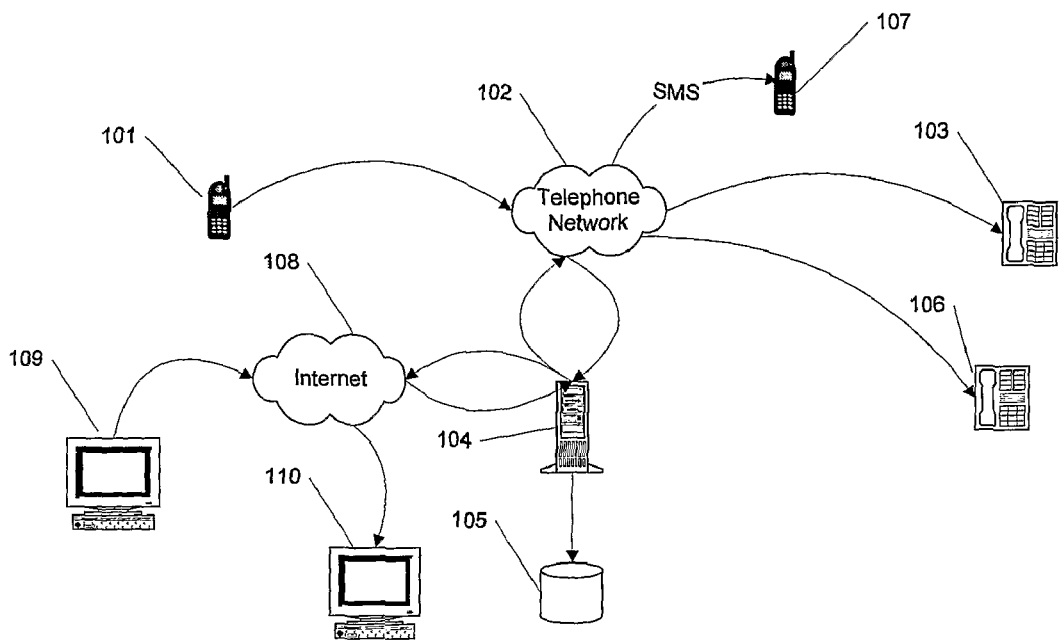
FIG. 1 is a diagram of the interconnection between various service providers and a dissemination database.
FIG. 2 is a layout of a typical message allocation page in the database administration.

FIG. 1 shows the use of a database (105) which database contains a list of trigger events and a series of related communication channels and message identifiers. On the occurrence of a trigger event the related events are retrieved from the database (105) and the related message identifier is sent on the related communication channel. Thus a call inwards from a mobile telephone (101) to the server (104) via a telephone network (102) results in the identification of a specific trigger event at the database. This trigger event may be based on the calling number and the number being called, though other factors, such as the precise time, may also act to select the specific trigger event located. Once the event is located the action specified by the event will take place, this being the creation of a message on a specific communication channel, such as a specific telephone number, an SMS number, an IP address, or some other method of carrying a communication. The communication includes a message identifier, which may be something such as the caller ID of a telephone, the source IP address of an IP packet, a text code in an SMS message, or some other item of data. This item carries very little information, but it identifies, to the receiver, the message which is implied. Such messages are typically held in the database (105) against the trigger event, and will have been previously provided to the destination address of the communication, so the receiver is aware of the import of the received communication, even if no actual message data is provided.

Thus a telephone number 1234567 may be dialed by number 3422332, where 3422332 is a callers number which is identified as part of a trigger event at the server and is in the database. It is first determined that 3422332 is in the database and then called number 1234567 is looked up in the database. This may indicate that the action of calling 7659323 with a caller ID of 1234567 should be taken, and the service provider then does this. In a similar manner the number 1234567 dialed by a different phone 5372213 may indicate that number 6552323 should be dialed with a caller ID of 1234567. In both cases, if the call is answered the call will normally simply drop when answered, since there is no caller, but the caller ID at the number called is effectively a message in itself since it provides a phone number which has a unique meaning for that user. The receipt of the unique caller ID may, in conjunction with telephone associated hardware or software, be set to provide a particular message, or to take some action through attached hardware or software, such as turning an alarm system on or off.

Since it is impossible to provide that particular caller ID to the called phone without going through the server there is strong security in carrying out such actions using this indirect method.

FIG. 2 shows the method of setting up a message for a user with a specified calling phone where the message is allocated to one of a number of system codes available to a user, these being visible in the left pane. The message can then be allocated against one of a number of phone numbers which are hosted by the system, for sending to a particular called phone number. The variation shown provides for two destination phone numbers, each with a panel of chosen messages for a particular calling number, one being the default number, with particular outward calling numbers being set as chosen ones of the messages. It should be noted that the outward number may differ between the two phones for the same message meaning to provide additional security.

Figures 3, 5:
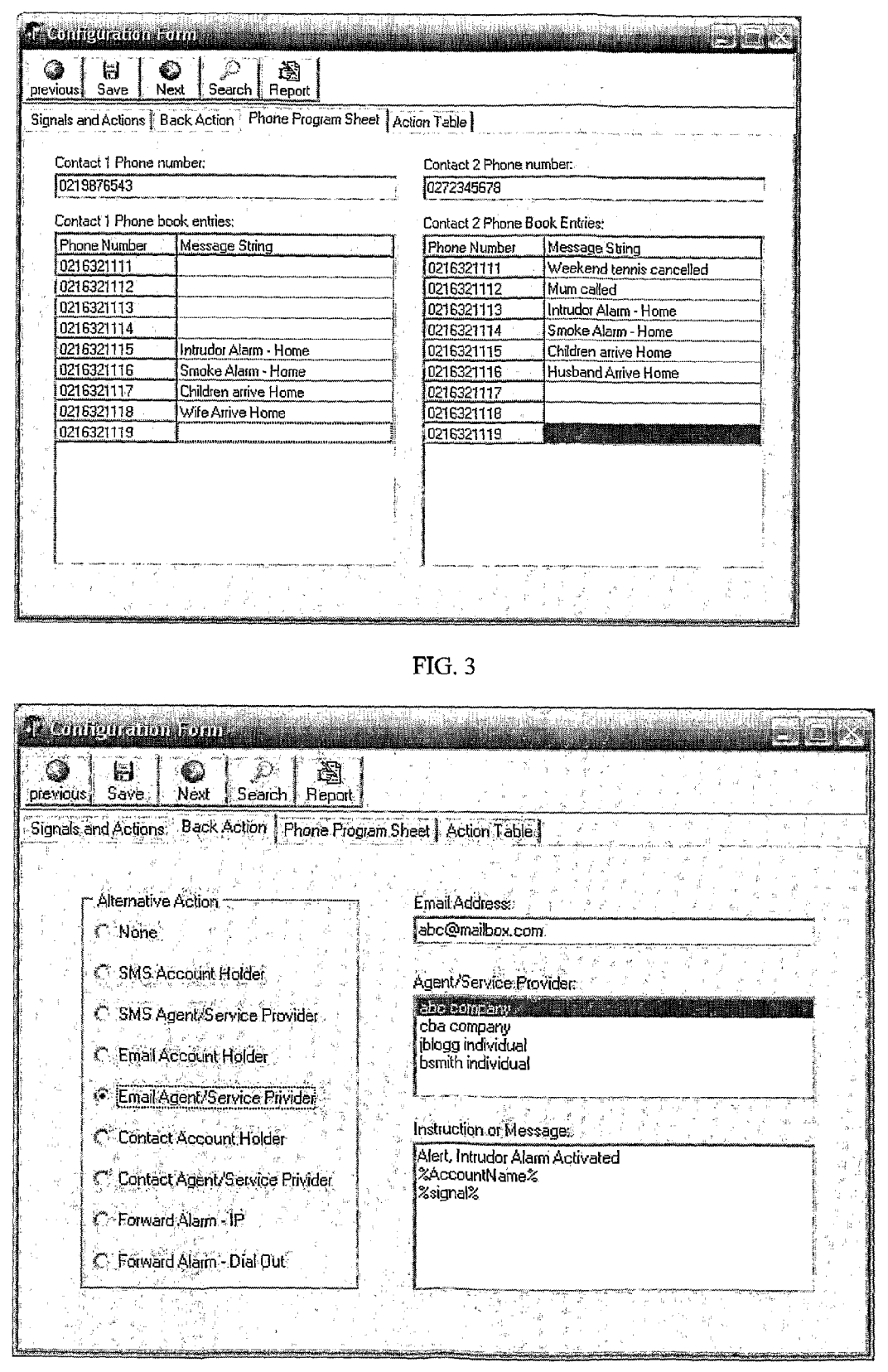

FIG. 3 shows the users view of messages set up for two phone numbers which may be printed out so that the receiving phone has a record of what message a particular calling number implies.

The messages may be further expanded by allocating common words or phrases to differing numbers so that a message can be built up from sequential use of these.

For example, message "I am home" may be represented by three separate telephone calls ("I" on 1234567, 'am" on 1234568 and "home" on 1234569). In this way many differing messages may be sent instead of making one telephone call to represent the message "I am home" as described above. The three calls may be three separate actions initiated by three separate phone calls or they may be three sequential actions associated with a single phone call.

While the action described so far is that of calling a differing number via the action server, other actions may be taken.

Figure 4:
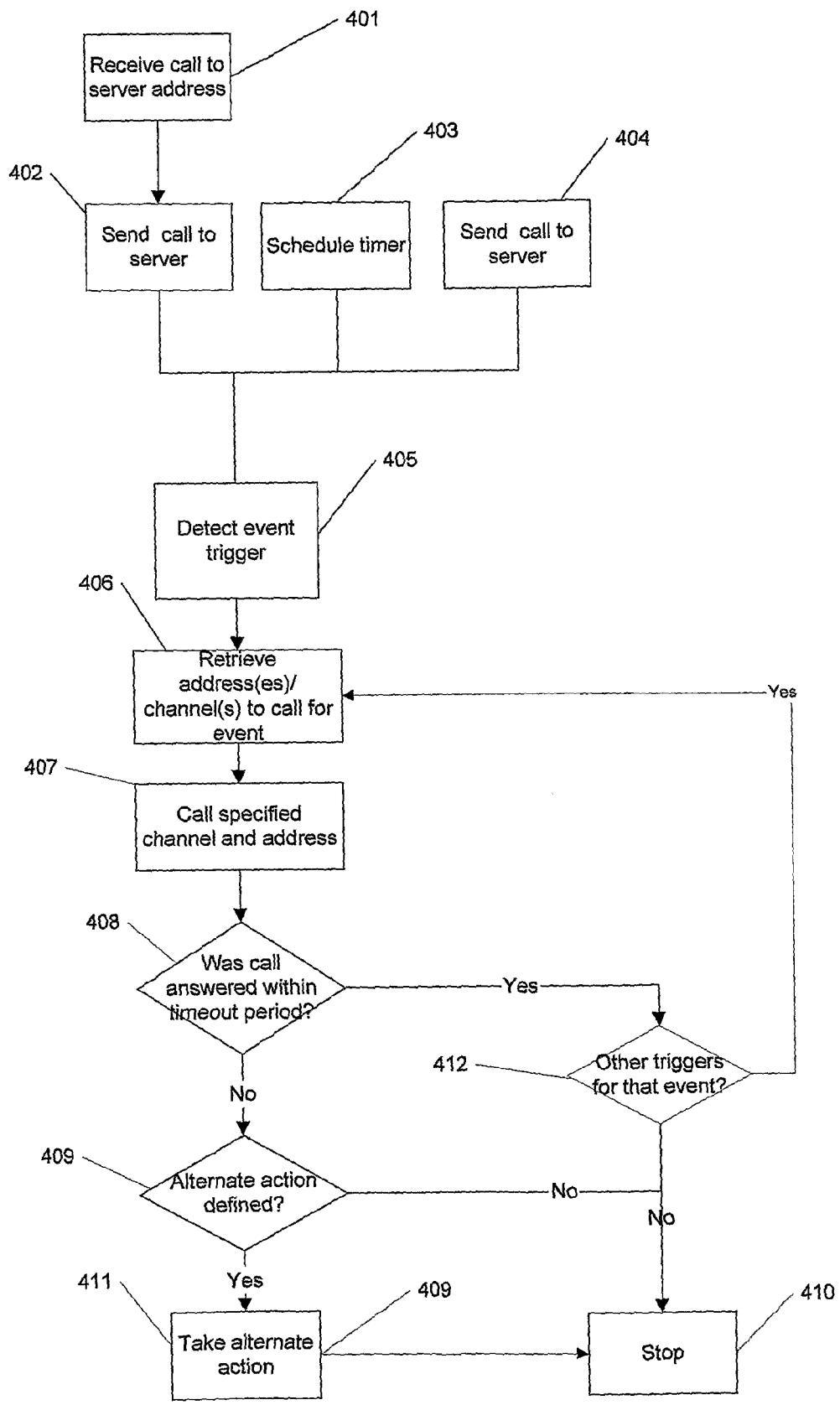
FIG. 4 is a flow diagram of the creation of an outgoing communication.

FIG. 4 shows generally how a call for an address hosted by the server may be passed from a service provider (401) to the server at (402) since the server forms part of a normal address or number hierarchy. At the server the call is treated as a general event trigger at (405), and the data relating to that event is retrieved at (406). At (407) the specific communication channel and address (for instance a telephone call to a specified number, an Internet Protocol (IP) packet to a specified IP address) are retrieved and the call made at (407).

If the call is not answered within the default timeout period, as shown at (408), then the database is checked to see if there is an alternate action to be taken. This will normally be so where the message is of some importance. If an alternative action is found at step (409) then that action is initiated at (411), for instance, if a telephone call fails then an SMS message to a different number may be made.

The database may be user accessible via an internet connection to maintenance screens as shown in FIGS. 2 and 3, typically using the caller telephone number as the user name together with a password.

FIG. 5 shows some possible alternative actions available to a caller for any particular action, and these can be such as sending an SMS message, an email, or calling another phone number.

The invention is described in relation to its use for telephone, SMS and IP packet transfer of information indicating the presence of a message. Other systems of message transfer may be used, or variations of the described systems, for instance an IP address may be distinguished by the use of several different ports, each one indicating a different message to the receiver. Thus, if a the receiver allows communication by a number of IP ports, an IP packet may be sent on any one of that number, and will provide an indication of a unique message to the receiver, who will have a list of the source IP address, the IP port, and the message meaning. A message could be sent as a series of packets to differing ports, with each packet to a different port having a meaning from which a complete message could be assembled, or a message could be sent by a combination of multiple different communication channels, perhaps equivalent to one word each on SMS, telephone and an IP address.

Table 1 shows the transfer of a message to a server by broadcasting on a particular port a particular message ID, where the message ID is identified against a particular message at the receiving end or causes a particular trigger event to fire at the server.

TABLE 1

| Message ID | Client TCP port | Communication | Server TCP Server Port | Message ID |
|---|---|---|---|---|
| 1 | 10001 | → | 10001 - Listening | 1 |
| 2 | 10002 | → | 10002 - Listening | 2 |
| 3 | 10003 | → | 10003 - Listening | 3 |
| 4 | 10004 | → | 10004 - Listening | 4 |
| 5 | 10005 | → | 10005 - Listening | 5 |
| 6 | 10006 | → | 10006 - Listening | 6 |
| 7 | 10007 | → | 10007 - Listening | 7 |
| 8 | 10008 | → | 10008 - Listening | 8 |
| ... | ... | | ... | ... |
| N | 1000 + N | → | 1000 + N - Listening | N |

While the use of trigger events responsive to the receipt of a particular communication from a particular address, or a trigger event scheduled at certain times has been described other trigger events may result from various other occurrences, for instance as the result of an alarm at a premises or an internet query.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the message creation and transmission may vary dependent on the particular application for which it is used without variation in the spirit and scope of the present invention.

In addition, although the preferred embodiments described herein are directed to telephones in a telephone switching system, it will be appreciated by those skilled in the art that the teachings of the present invention can be applied to other systems such as those of an internet message switching system, without departing from the scope and spirit of the present invention.

INDUSTRIAL APPLICABILITY

The process of the invention is used in providing improved information and actions to subscribers to a communication channel which results in improved service and facilities for these subscribers. The present invention is therefore industrially applicable.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

The invention claimed is:

1. A method of sending a message on at least one communication channel having an originating end and a receiving end comprising:
   disseminating to originator and receiver a concordance of combinations of specified communication channel and specified message identifiers as providing specified messages,
   specifying a communication channel capable of carrying data identifying the required message,
   nominating a trigger event to cause the specified message identifier data to be sent on the specified communication channel,
   issuing the specified message identifier at the originating end of the communication channel on occurrence of the trigger event,
   detecting the specified message identifier at the receiving end of the communication channel,
   confirming receipt of the specified message identifier at the communication channel receiving end,
   terminating the communication on confirmation of receipt.

2. A method as claimed in claim 1 wherein multiple messages sent by the method of claim 1 can be interpreted as a single message, these multiple messages being defined by the concordance of claim 1 specifying sequential trigger events for one single message.

3. A method as claimed in claim 1 wherein one communication channel is a telephone line.

4. A method as claimed in claim 3 wherein a message identifier is the telephone caller ID data.

5. A method as claimed in claim 1 wherein the trigger event is generated at the lapse of a specified time.

6. A method as claimed in claim 1 wherein the trigger event is generated on receipt of a specified message at the message issuer.

7. A method as claimed in claim 1 wherein one communication channel is one port of a TCP/IP address.

8. A method as claimed in claim 7 wherein a message identifier is the IP source address.

9. A method as claimed in claim 1 wherein a list of available trigger events is held in a database at the message disseminator.

10. A method as claimed in claim 9 wherein each trigger event record has associated with it the information required to actuate that trigger event.

11. A method as claimed in claim 10 wherein the actuating information is an incoming communication to the message disseminator.

12. A method as claimed in claim 11 wherein the incoming communication required to trigger a specific trigger event is on a specified communication channel and contains a specified message identifier.

13. A method as claimed in claim 1 wherein if the receipt of a message originating from a trigger event is not confirmed, a further trigger event is forced.

14. A message disseminator comprising:
   an interface to multiple communication channels,
   a database maintaining a list of trigger events, corresponding communication channels, corresponding message identifiers and corresponding message texts,
   a trigger event actuator acting to cause the retrieval of a listed trigger event record and the subsequent issuing of a corresponding listed message identifier on a corresponding listed communication channel, a receipt identifier identifying when the message identifier has been received on the communication channel.

15. A message disseminator as claimed in claim 14 wherein the trigger event actuator is actuable by an incoming communication.

16. A message disseminator as claimed in claim 14 wherein the trigger event actuator is actuable by an internal event.

17. A message disseminator as claimed in claim 16 wherein the internal event is the expiration of a timing period.

18. A message disseminator as claimed in claim 14 wherein the communication channel is a telephone line, and the message receipt identifier is the off hook signal.

19. A message disseminator as claimed in claim 14 wherein the communication channel is an IP packet and the message receipt identifier is the confirmation of packet receipt.

* * * * *